(12) United States Patent
Takayama

(10) Patent No.: US 10,363,780 B2
(45) Date of Patent: Jul. 30, 2019

(54) PNEUMATIC TIRE

(71) Applicant: SUMITOMO RUBBER INDUSTRIES, LTD., Kobe-shi, Hyogo (JP)

(72) Inventor: Hitoshi Takayama, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 761 days.

(21) Appl. No.: 14/959,255

(22) Filed: Dec. 4, 2015

(65) Prior Publication Data

US 2016/0176235 A1 Jun. 23, 2016

(30) Foreign Application Priority Data

Dec. 17, 2014 (JP) .................................. 2014-254743

(51) Int. Cl.
*B60C 11/11* (2006.01)
*B60C 11/03* (2006.01)

(52) U.S. Cl.
CPC ...... *B60C 11/0318* (2013.01); *B60C 11/0306* (2013.01); *B60C 11/11* (2013.01); *B60C 2011/0346* (2013.01); *B60C 2011/0358* (2013.01); *B60C 2011/0372* (2013.01)

(58) Field of Classification Search
CPC . B60C 11/0306; B60C 11/0318; B60C 11/11; B60C 2011/0346
See application file for complete search history.

(56) References Cited

U.S. PATENT DOCUMENTS

| D447,446 | S | * | 9/2001 | Allison | ....................... D12/600 |
| D753,583 | S | * | 4/2016 | Hao | ............................ D12/512 |
| 2007/0089821 | A1 | * | 4/2007 | Kishizoe | ........... B29D 30/0606 152/209.2 |
| 2012/0000586 | A1 | | 1/2012 | Kami | |
| 2014/0230983 | A1 | * | 8/2014 | Tagashira | ............ B60C 11/1259 152/209.23 |
| 2015/0059941 | A1 | * | 3/2015 | Niwa | ................... B60C 11/0083 152/209.14 |

FOREIGN PATENT DOCUMENTS

| JP | 08-025914 A | * | 1/1996 |
| JP | 2012-11981 A | | 1/2012 |

OTHER PUBLICATIONS

Machine translation for Japan 08-025914 (Year: 2018).*

* cited by examiner

*Primary Examiner* — Steven D Maki
(74) *Attorney, Agent, or Firm* — Birch, Stewart, Kolasch & Birch, LLP

(57) ABSTRACT

A pneumatic tire is provided in the tread portion with zigzag crown circumferential grooves 3 having pitch length Pc, zigzag shoulder circumferential grooves 4 having pitch length Ps, crown lateral grooves 5 inclined at an angle θc, and shoulder lateral grooves 6 inclined at an angle θs wherein Ps>Pc and θs<θc. Both ends of the respective crown lateral grooves 5 are connected to the zigzag groove segments 3a or 3b of the crown circumferential grooves 3 which groove segments 3a or 3b are inclined with respect to the tire axial direction to the opposite direction to the inclining direction of the crown lateral grooves 5. The number NS of the shoulder lateral grooves 6 is more than the number Nc of the crown lateral grooves 5.

5 Claims, 4 Drawing Sheets

PNEUMATIC TIRE

BACKGROUND OF THE INVENTION

The present invention relates to a pneumatic tire, more particularly to a tread pattern capable of improving noise performance.

In general, tires for winter use such as snow tire designed for running on snowy roads are provided in the tread portion with a block pattern in order to improve on-snow performance. In such block pattern tires, however, due to the pitch sound and pumping sound, noise performance when running on pavements such as well paved asphalt roads is not good.

On the other hand, the Japanese Patent Application Publication No. 2012-011981 (corresponding to US-2012-000586A1) discloses a pneumatic tire which is as shown in FIG. 4 provided with a crown circumferential groove (a) disposed on each side of the tire equator C, a shoulder circumferential groove (b) disposed on the axially outside of each of the crown circumferential grooves (a), crown lateral grooves (d) extending between the crown circumferential grooves (a), middle lateral grooves (e) extending between the crown circumferential grooves (a) and the shoulder circumferential grooves (b), and shoulder lateral grooves (f) extending between the shoulder circumferential grooves (b) and the tread edges Te, wherein each of the circumferential main grooves (a) and (b) is a zigzag groove extending in a trapezoidal waveform, and parameters such as the zigzag amplitude and groove width of each main groove, the number of the lateral grooves in the ground contacting patch of the tire, and the groove width of the lateral grooves are specifically defined in order to improve the mud performance without sacrificing the noise performance.

Even if this tire is useful as a snow tire to some extent, namely, when used on muddy melted snow, the noise performance is still not satisfactory in recent demand for low noise snow tires.

SUMMARY OF THE INVENTION

It is therefore, an object of the present invention to provide a pneumatic tire, in which noise performance is improved without sacrificing other performances such as on-snow performance.

According to the present invention, a pneumatic tire comprises a tread portion provided on each side of the tire equator with a crown circumferential groove, a shoulder circumferential groove disposed axially outside the crown circumferential groove, and shoulder lateral grooves extending between the shoulder circumferential groove and the adjacent tread edge and inclined at an angle θs with respect to the tire axial direction, the tread portion further provided with crown lateral grooves extending between the crown circumferential grooves and inclined at an angle θc with respect to the tire axial direction, the crown circumferential groove and the shoulder circumferential groove each being a zigzag groove made up of alternately arraigned first groove segments and second groove segments, the first groove segments inclined with respect to the tire circumferential direction to one tire axial direction, and the second groove segments inclined with respect to the tire circumferential direction to the other tire axial direction, wherein a zigzag pitch length Ps of the shoulder circumferential groove is less than a zigzag pitch length Pc of the crown circumferential grooves, both ends of the respective crown lateral grooves are respectively connected to one of the groove segments of one of the crown circumferential grooves and one of the groove segments of the other crown circumferential groove, the groove segments to which the crown lateral grooves are connected are inclined with respect to the tire axial direction to one tire circumferential direction, whereas the crown circumferential grooves are inclined with respect to the tire axial direction to the other tire circumferential direction, the angle θs of the shoulder lateral grooves is less than the angle θc of the crown lateral grooves, and the number Ns of the shoulder lateral grooves is more than the number Nc of the crown lateral grooves.

Further, the pneumatic tire according to the present invention may include the following features (1)-(3):

(1) the inner ends in the tire axial direction of the shoulder lateral grooves are connected to zigzag inflection portions of the shoulder circumferential groove;

(2) the tread portion is further provided on each side of the tire equator with middle lateral grooves extending between the crown circumferential groove and the shoulder circumferential groove and inclined at an angle θm with respect to the tire axial direction, the inner ends in the tire axial direction of the middle lateral grooves are connected to zigzag inflection portions of the crown circumferential groove, and the outer ends in the tire axial direction of the middle lateral grooves are connected to zigzag inflection portions of the shoulder circumferential groove;

(3) the groove segments of the shoulder circumferential groove are alternately arranged shorter groove segments and longer groove segments, and each of the middle lateral grooves is arranged in a line with one of the shorter groove segments.

In the present invention, the crown circumferential grooves and the shoulder circumferential grooves are zigzag, therefore, the edge effect is increased, and the on-snow performance can be improved without sacrificing noise performance.

Further, the zigzag pitch length Ps of the shoulder circumferential groove being less than the zigzag pitch length Pc of the crown circumferential groove increases the pitch number or zigzag number of the shoulder circumferential groove, and the axial component of the edge length of the shoulder circumferential groove can be increased. Accordingly, the edge effect is increased in the tread shoulder having more effect on the on-snow performance, and the snow traction performance can be improved. Further, as the zigzag number of the shoulder circumferential groove increases, the rigidity in the tread shoulder is decreased to reduce the pattern noise.

Since the both ends of the crown lateral groove are connected to the groove segments of the crown circumferential grooves which groove segments are inclined to the opposite direction to the inclining direction of the crown lateral grooves, a pitch variation effect is caused, and pattern noise from the tread crown can be reduced.

Since the angle θs of the shoulder lateral grooves is less than the angle θc of the crown lateral grooves, the edge effect is increased in the tread shoulder having more effect on the on-snow performance, and the snow traction performance can be improved. There is a possibility that the angle θs being less than the angle θc deteriorates the noise performance, but the deterioration of the noise performance can be compensated by the angle θc of the crown lateral grooves 5 becoming larger.

As the number Ns of the shoulder lateral grooves is increased to become more than the number Nc of the crown lateral grooves, the axial component of the edge length of the shoulder lateral grooves is increased, and the edge effect is increased in the tread shoulder having more effect on the on-snow performance. Thus, the snow traction performance can be improved. Further, as the number Ns is increased, the rigidity in the tread shoulder is decreased, and the pattern noise can be reduced.

In cooperation with the above explained effects, good noise performance can be obtained without sacrificing the on-snow performance.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges determined as above.

DESCRIPTION OF THE PREFERRED EMBODIMENTS

Embodiments of the present invention will now be described in detail in conjunction with the accompanying drawings.

Figure 1:
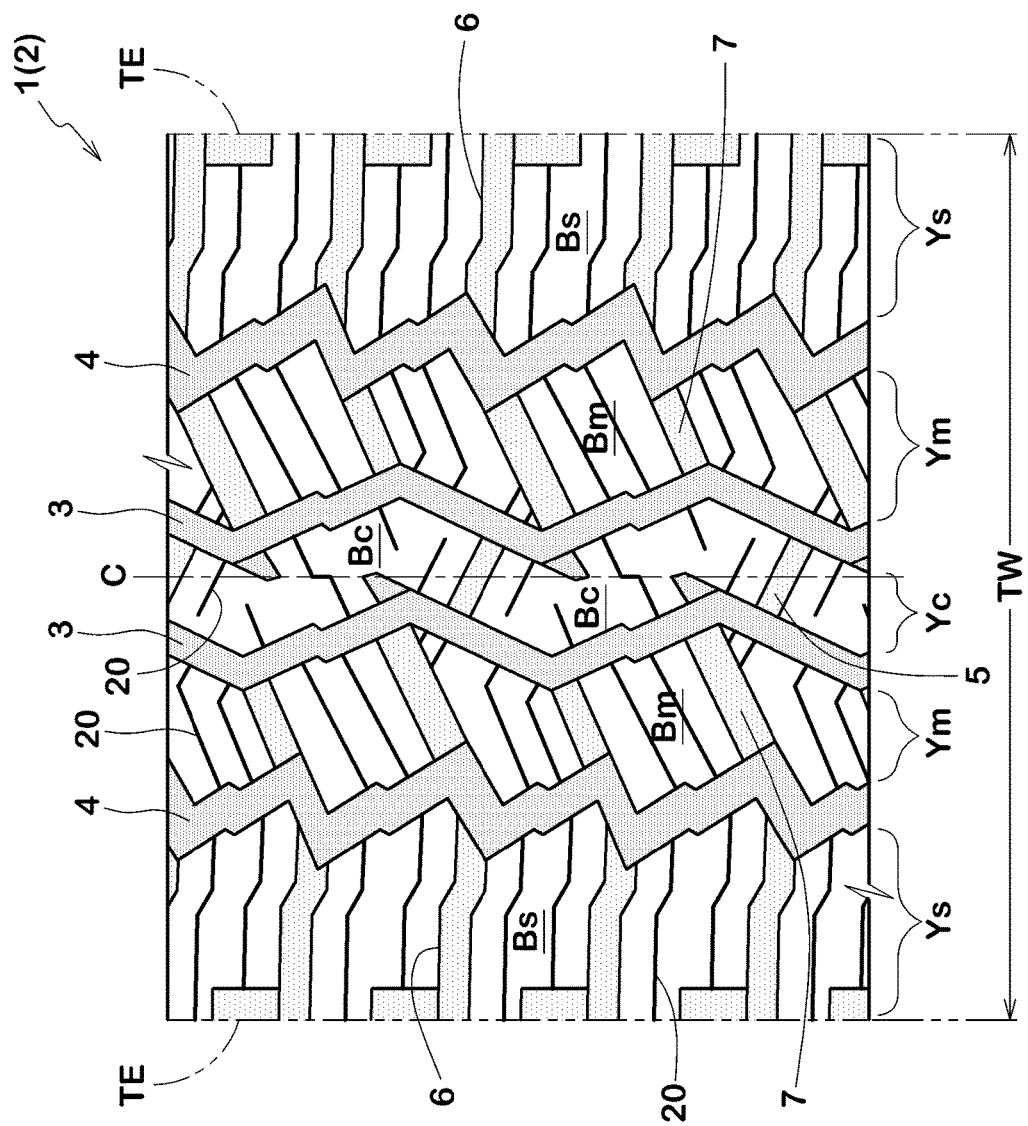
FIG. 1 is a developed partial view of the tread pattern of a pneumatic tire as an embodiment of the present invention.

As shown in FIG. 1, a pneumatic tire 1 as an embodiment of present invention comprises a tread portion 2 provided with a pair of crown circumferential grooves 3 disposed one on each side of the tire equator C, a pair of shoulder circumferential grooves 4 disposed axially outside the crown circumferential grooves 3, a plurality of crown lateral grooves 5 extending across the entire axial width of a crown region Yc defined between the crown circumferential grooves 3, and a plurality of shoulder lateral grooves 6 extending across the entire axial width of a shoulder region Ys defined between each of the shoulder circumferential grooves 4 and the adjacent tread edge Te.

Thereby, the crown region Yc is divided into a plurality of center blocks BC, and each of the shoulder regions Ys is divided into a plurality of shoulder blocks Bs.

In this example, the tread portion 2 is further provided with a plurality of middle lateral grooves 7 extending across the entire axial width of each of middle regions Ym defined between the crown circumferential grooves 3 and the shoulder circumferential grooves 4.

Thereby, each of the middle regions Ym is divided into a plurality of middle blocks Bm.

In this embodiment, the pneumatic tire 1 is designed as a snow tire.

Figure 2:
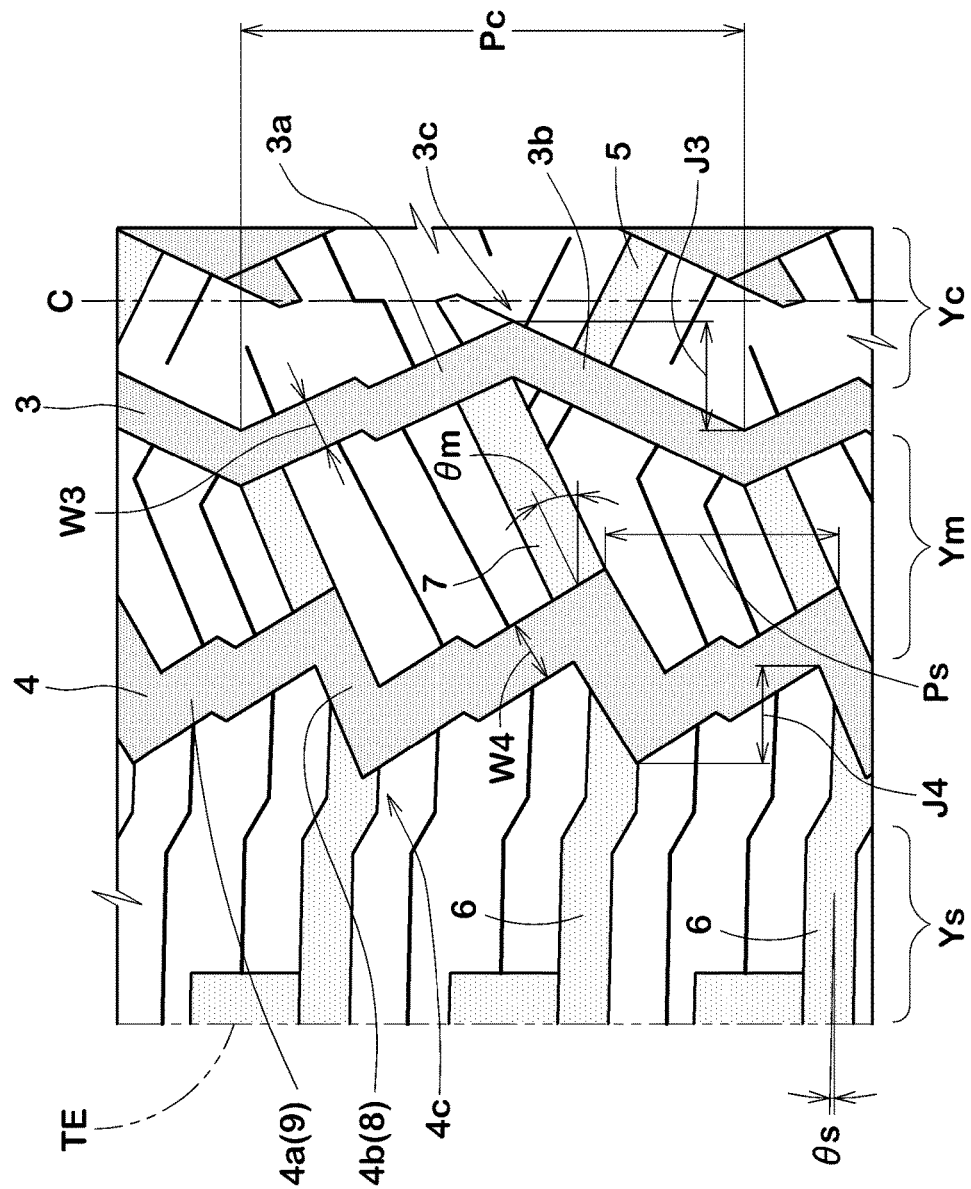
FIG. 2 is a closeup of FIG. 1 showing a middle region and a shoulder region.
Figure 3:
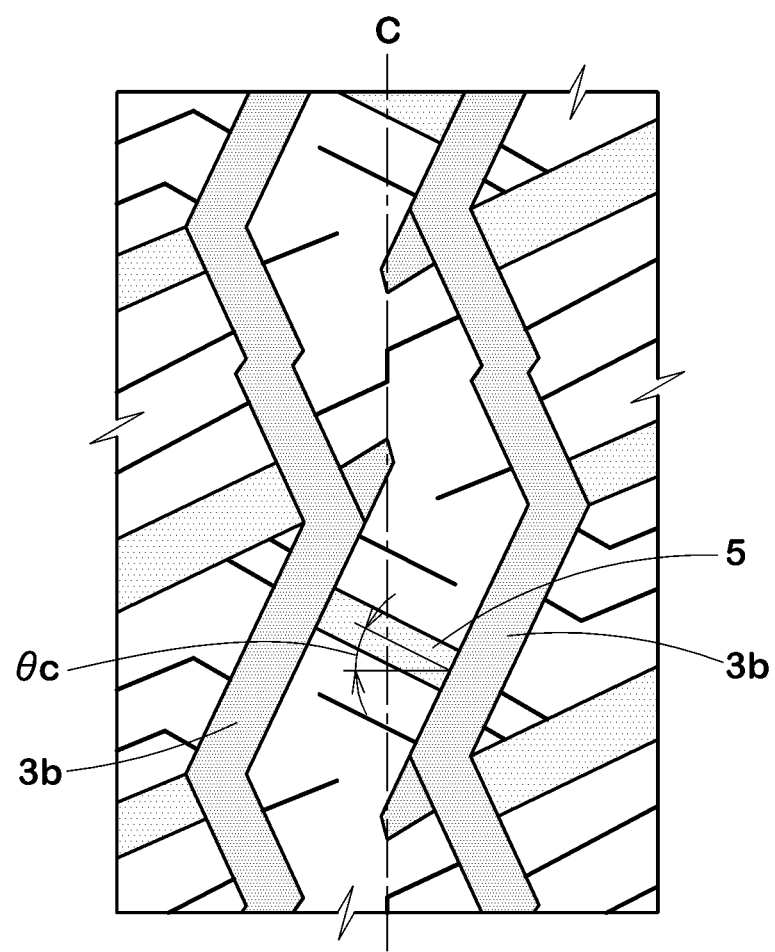
FIG. 3 is a closeup of FIG. 1 showing a crown region.
Figure 4:
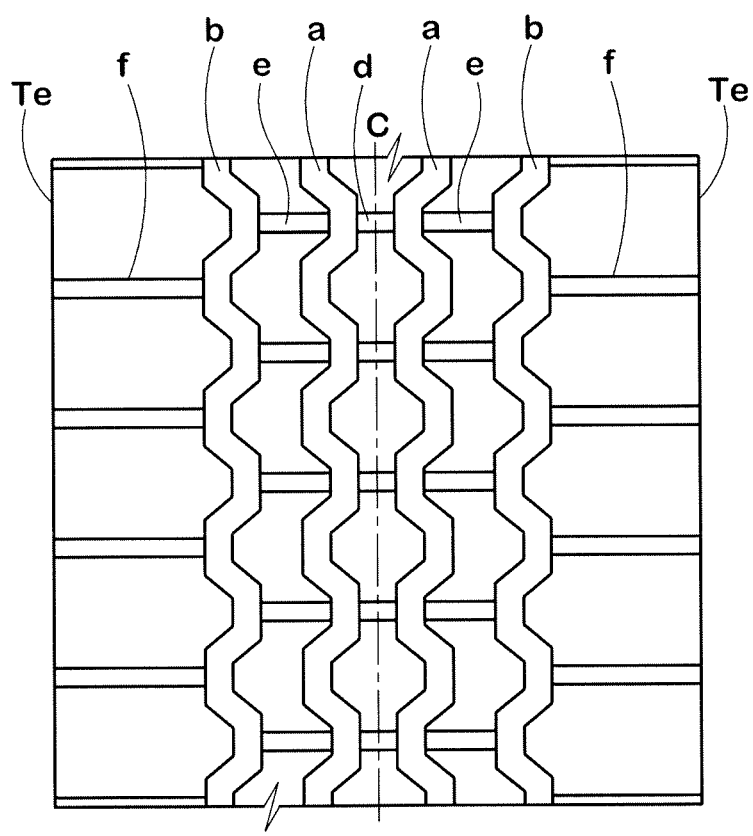
FIG. 4 is a developed partial view showing the tread pattern of a prior art tire.

As shown in FIG. 2, the crown circumferential groove 3 is a zigzag groove made up of alternately arranged groove segments 3a and groove segment 3b.

The groove segments 3a are inclined with respect to the tire circumferential direction to one tire axial direction.

The groove segments 3b are inclined with respect to the tire circumferential direction to the other tire axial direction.

Points or portions of the crown circumferential groove 3 where the groove segments 3a meet the groove segments 3b are called "zigzag inflection portions" 3c.

Similarly, the shoulder circumferential groove 4 is a zigzag groove made up of alternately arranged groove segments 4a and groove segment 4b.

The groove segments 4a are inclined with respect to the tire circumferential direction to one tire axial direction.

The groove segments 4b are inclined with respect to the tire circumferential direction to the other tire axial direction.

Points or portions of the shoulder circumferential groove 4 where the groove segments 4a meet the groove segments 4b are called "zigzag inflection portions" 4c.

The widths and depths of the circumferential grooves 3 and 4 may be arbitrarily defined. However, if the widths and depths are too small, on-snow performance and wet performance are deteriorated. If too large, the steering stability when running on pavements is liable to deteriorate.

It is therefore, preferable that each of the crown circumferential groove 3 and the shoulder circumferential groove 4 has a groove width of from 3% to 9% of the tread width TW and a groove depth of from 6 to 16 mm.

In this example, since the shoulder circumferential groove 4 has more effect on the on-snow performance than the crown circumferential groove 3, the groove width W4 of the shoulder circumferential groove 4 is set to be more than the groove width W3 of the crown circumferential groove 3 in order to improve the on-snow performance within a limited freedom of the land ratio. If the groove width of the circumferential main groove 3, 4 is variable, the mean value of the maximum and minimum of the variable groove width may be used as the groove width W3, W4. In this example, the groove depth of the crown circumferential groove 3 is the same as the groove depth of the shoulder circumferential groove 4.

The zigzag pitch length Ps of the shoulder circumferential groove 4 is less than the zigzag pitch length Pc of the crown circumferential groove 3.

Thereby, the middle region Ym extends in the tire circumferential direction while repeatedly increasing and decreasing its axial width.

The two crown circumferential grooves 3 are arranged side by side in substantially coordinate phase in the tire circumferential direction, therefore, the crown region Yc extends zigzag in the tire circumferential direction while keeping a substantially constant axial width.

If a variable pitching method is employed in the groove arrangement and thereby the pitch length Ps, Pc varies, then the quotient of the circumference of the tire measured at the tire equator C divided by the number of pitches of the zigzag may be used as the pitch length Ps, Pc.

By satisfying Ps<Pc as explained above, the zigzag number of the shoulder circumferential groove 4 increases, and the axial component of edge length of the groove 4 can be increased. Accordingly, the edge effect is increased in the tread shoulder having more effect on the on-snow performance, and the snow traction can be increased. Further, as the zigzag number of the shoulder circumferential groove 4 is increased, the rigidity of the tread shoulder is decreased, and pattern noise resulting from the zigzag groove can be decreased.

In view of the above described advantages effect, the pitch length Ps is more preferably not more than 1/1.5 times, still more preferably not more than ½ times the pitch length Pc.

In the shoulder circumferential groove 4, either the groove segments 4a or the groove segments 4b (in this example, groove segments 4b) are formed as shorter groove segments 8 having a shorter length, and the other (in this example, groove segments 4a) are formed as longer groove segments 9 having a longer length than that of the shorter groove segments 8.

The longer groove segments 9 in this example (groove segments 4a) are substantially parallel with either the groove segments 3a or the groove segments 3b (in this example, groove segments 3a) of the crown circumferential groove 3. Thereby, between the groove segments 3a and the groove segments 4a, the middle region Ym becomes substantially constant in the width in a perpendicular direction to the groove segments 3a and 4a, which is advantageous to the steering stability.

Here, the expression "substantially parallel" means an angle difference of at most 5 degrees is permitted between the longer groove segment 9 and the groove segment 3a.

Preferably, the amplitude J4 of zigzag of the shoulder circumferential groove 4 is set in a range of from 0.75 to 1.5 times the amplitude J3 of zigzag of the crown circumferential groove 3.

If outside this range, there is a possibility that uneven wear resistance of the middle region Ym is deteriorated.

If the amplitude J3, J4 varies in the longitudinal direction of the groove 3, 4, then the mean value of the maximum and minimum of the variable amplitude may be used as the amplitude J3, J4.

The shoulder lateral grooves 6 are inclined with respect to the tire axial direction at an angle $\theta$s.

The axially inner ends of the shoulder lateral grooves 6 are connected to the inflection portions 4c of the shoulder circumferential groove 4 so that each inflection portion 4c is positioned between the opposite groove-sidewalls of one of the shoulder lateral grooves 6.

In contrast, the crown lateral grooves 5 are inclined with respect to the tire axial direction at an angle $\theta$c, and both ends of each of the crown lateral grooves 5 are connected to either the groove segments 3a or the groove segments 3b of the crown circumferential grooves 3 on both sides thereof (in this example, groove segments 3b on both sides thereof) so that each end is positioned between the inflection portions 3c of one of the crown circumferential grooves 3.

Further, the groove segments 3b to which the crown lateral grooves 5 are connected are inclined with respect to the tire axial direction to one tire circumferential direction whereas the crown lateral grooves 5 are inclined with respect to the tire axial direction to the other tire circumferential direction.

As a result, a pitch variation effect is caused by the zigzag of the crown circumferential grooves 3 and the crown lateral grooves 5, and pattern noise from the tread crown can be reduced.

Further, the angle $\theta$s is set to be less than the angle $\theta$c. Thereby, the edge effect is increased in the tread shoulder having more effect on the on-snow performance, and snow traction performance can be improved.

There is a possibility that the angle $\theta$s being less than the angle $\theta$c deteriorates the noise performance, but the deterioration of the noise performance can be compensated by the angle $\theta$c of the crown lateral grooves 5 becoming larger. The angle $\theta$s is preferably set in a range of from 5 to 14 degrees.

If the angle $\theta$s is less than 5 degrees, it becomes difficult for the crown lateral grooves 5 to compensate the deterioration of the noise performance.

If the angle $\theta$s is more than 14 degrees, it becomes difficult to improve the traction performance on snow.

The angle $\theta$c is preferably set in a range of not less than 15 degrees, more preferably in a range of from 20 to 40 degrees. If the angle $\theta$c is less than 15 degrees, it becomes difficult to improve the noise performance.

As shown in FIG. 2, the middle lateral grooves 7 are inclined with respect to the tire axial direction at an angle $\theta$m.

The axially inner ends of the middle lateral grooves 7 are connected to the inflection portions 3c of the crown circumferential grooves 3 so that each of the inflection portions 3c is positioned between the opposite groove-sidewalls of one of the middle lateral grooves 7.

The axially outer ends of the middle lateral grooves 7 are connected to the inflection portions 4c of the shoulder circumferential grooves 4 so that each of the inflection portions 4c is positioned between the opposite groove-sidewalls of one of the middle lateral grooves 7.

The middle lateral grooves 7 are inclined with respect to the tire axial direction to one tire circumferential direction which is opposite to the inclining direction of the crown lateral groove 5.

During running on snowy roads, in the ground contacting patch of the tire, snow in the groove segments of a zigzag groove is compressed toward the inflection portions or points of the zigzag groove.

In this example, since the inner ends and outer ends of the middle lateral grooves 7 are connected to the inflection portions 3c and 4c of the circumferential grooves 3 and 4, the compacted snow in the middle lateral grooves 7 and the compacted snow in the circumferential groove 3, 4 form stiff tree-shaped compacted snow. Thereby, the snow traction performance can be improved.

Further, as the inner ends of the shoulder lateral groove 6 are connected to the inflection portions 4c of the shoulder circumferential groove 4, the compacted snow in the shoulder lateral grooves 6 and the compacted snow in the shoulder circumferential groove 4 form stiff tree-shaped compacted snow. Thereby, the snow traction performance can be improved.

In this example, each of the middle lateral grooves 7 is arranged in a line with one of the shorter groove segments 8 of the adjacent shoulder circumferential groove 4 in order to expedite ejection of snow compressed in the grooves 7 and 8 and improve the on-snow performance.

According to the present invention, the number Ns of the shoulder lateral grooves 6 disposed in each of the shoulder regions Ys is more than the number Nc of the crown lateral grooves 5 formed in the crown region Yc.

In this example, the number Ns is 2 times the number Nc.

By satisfying Ns>Nc as explained above, the axial component of the edge length of the shoulder lateral grooves 6 can be increased. Namely, in the tread shoulder having more effect on the on-snow performance, the edge effect is increased, and the snow traction performance can be improved.

Further, as the number Ns is increased, the rigidity in the tread shoulder is decreased, therefore, it is possible to decrease the pattern noise due to the zigzag and the shoulder lateral grooves 6.

In this example, the center blocks BC, the middle blocks Bm, and the shoulder blocks Bs are each provided with sipes 20 to improve the grip performance on icy road.

While detailed description has been made of a preferable embodiment of the present invention, the present invention can be embodied in various forms without being limited to the illustrated embodiment.

Comparison Tests

Based on the tread pattern shown in FIG. 1, snow tires of size 265/70R17 (rim side 17×7.5) having specifications listed in Table 1 were experimentally manufactured and tested for the on-snow performance and noise performance by the use of a test car (2400 cc four-wheel drive passenger car) provided on all wheels with the same kind of test tires inflated to 220 kPa.

<On-Snow Performance>

Using the above-mentioned test car, traction performance when running on snowy road was evaluated by the test driver. The results are indicated in Table 1 by an index based on comparative example 1 being 100, wherein the larger the value, the better the on-snow performance.

<Noise Performance>

Using a tire test drum, the test tire running at a speed of 80 km/h was measured for the noise level of pattern noise. The measured noise level (dB) is indicated in Table 1 as the difference from the reference value of comparative example 1.

TABLE 1

| Tire | Ref. 1 | Ref. 2 | Ref. 3 | Ref. 4 | Ref. 5 | Ex. 1 | Ex. 2 |
|---|---|---|---|---|---|---|---|
| crown circumferential grooves | | | | | | | |
| pitch length Pc (mm) | 138 | 138 | 138 | 138 | 138 | 138 | 138 |
| shoulder circumferential grooves | | | | | | | |
| pitch length Ps (mm) | 138 (Ps = Pc) | 69 (Ps < Pc) | 138 (Ps = Pc) | 138 (Ps = Pc) | 138 (Ps = Pc) | 69 (Ps < Pc) | 69 (Ps < Pc) |
| crown lateral grooves | | | | | | | |
| number Nc | 56 | 56 | 56 | 56 | 56 | 56 | 56 |
| angle θc (deg.) | 20 | 20 | 20 | 20 | 20 | 20 | 20 |
| inclining direction (*) | — | — | — | — | opposite | opposite | opposite |
| connected position to crown circumferential groove | inflection portion | inflection portion | inflection portion | inflection portion | groove segment | groove segment | groove segment |
| shoulder lateral grooves | | | | | | | |
| number Ns | 56 (Ns = Nc) | 56 (Ns = Nc) | 56 (Ns = Nc) | 112 (Ns > Nc) | 56 (Ns = Nc) | 112 (Ns > Nc) | 112 (Ns > Nc) |
| angle θs (deg.) | 20 (θs = θc) | 20 (θs = θc) | 5 (θs < θc) | 20 (θs = θc) | 20 (θs = θc) | 5 (θs < θc) | 5 (θs < θc) |
| connected position to shoulder circumferential groove | inflection portion | inflection portion | inflection portion | inflection portion | inflection portion | inflection portion | groove segment |
| middle lateral grooves | | | | | | | |
| connected position to crown circumferential groove | inflection portion | inflection portion | inflection portion | inflection portion | inflection portion | inflection portion | groove segment |
| connected position to shoulder circumferential groove | inflection portion | inflection portion | inflection portion | inflection portion | inflection portion | inflection portion | groove segment |
| on-snow performance | 100 | 102 | 103 | 103 | 100 | 113 | 110 |
| noise performance (dB) | reference value | −0.6 | 0.4 | −0.6 | −0.4 | −3.5 | −3.5 |

(*) whether the inclining direction of the crown lateral grooves was the "same" as or "opposite" to the inclining direction of the groove segments to which the crown lateral grooves were connected.

As shown in Table 1, it was confirmed that the tires according to the present invention can be improved in the noise performance while maintaining the on-snow performance at high level.

REFERENCE SIGNS LIST 1 pneumatic tire
2 tread portion
3 crown circumferential groove
3a, 3b groove segment
3c inflection portion
4 shoulder circumferential groove
4a, 4b groove segment
4c inflection portion
5 crown lateral groove
6 shoulder lateral groove 7 middle lateral groove
8 shorter groove segment
9 longer groove segment

The invention claimed is:

1. A pneumatic tire comprising
a tread portion provided on each side of the tire equator with a crown circumferential groove, a shoulder circumferential groove disposed axially outside the crown circumferential groove, and shoulder lateral grooves extending between the shoulder circumferential groove and the adjacent tread edge,
the tread portion further provided with crown lateral grooves extending straight between the crown circumferential grooves,
said crown circumferential groove and said shoulder circumferential groove each being a zigzag groove made up of alternately arranged first groove segments and second groove segments,
wherein
each of the first groove segments has a crank shape made up of a shorter central part extending in a direction and two longer parts on both sides of the central part and extending in a different direction inclined with respect to the tire circumferential direction to one tire axial direction, and
each of the second groove segments has a straight shape inclined with respect to the tire circumferential direction to the other tire axial direction,
wherein
a zigzag pitch length Ps of said shoulder circumferential groove is less than a zigzag pitch length Pc of said crown circumferential groove, wherein the zigzag pitch length is the total circumferential length of one first groove segment and one second groove segment,
both ends of each of the crown lateral grooves are respectively connected to one of the second groove segments of one of the crown circumferential grooves and one of the second groove segments of the other crown circumferential groove,
the second groove segments to which the crown lateral grooves are connected are inclined with respect to the tire axial direction to one tire circumferential direction, whereas the crown lateral grooves are inclined at an angle $\theta c$ with respect to the tire axial direction to the other tire circumferential direction,
the shoulder lateral grooves each extend at an angle $\theta s$ with respect to the tire axial direction which is less than the angle $\theta c$ of the crown lateral grooves, and
the number Ns of the shoulder lateral grooves on each side of the tire equator is more than the number Nc of the crown lateral grooves.

2. The pneumatic tire according to claim 1, wherein
the inner ends in the tire axial direction of the shoulder lateral grooves are connected to zigzag inflection portions of the shoulder circumferential groove.

3. The pneumatic tire according to claim 2, wherein
the tread portion is further provided on each side of the tire equator with middle lateral grooves extending between the crown circumferential groove and the shoulder circumferential groove and inclined at an angle $\theta m$ with respect to the tire axial direction,
the inner ends in the tire axial direction of the middle lateral grooves are connected to zigzag inflection portions of said crown circumferential groove, and
the outer ends in the tire axial direction of the middle lateral grooves are connected to zigzag inflection portions of said shoulder circumferential groove.

4. The pneumatic tire according to claim 1, wherein
the tread portion is further provided on each side of the tire equator with middle lateral grooves extending between the crown circumferential groove and the shoulder circumferential groove and inclined at an angle $\theta m$ with respect to the tire axial direction,
the inner ends in the tire axial direction of the middle lateral grooves are connected to zigzag inflection portions of said crown circumferential groove, and
the outer ends in the tire axial direction of the middle lateral grooves are connected to zigzag inflection portions of said shoulder circumferential groove.

5. The pneumatic tire according to claim 4, wherein
in the shoulder circumferential grooves, the second groove segments are shorter than the first groove segments, and
each of the middle lateral grooves is arranged in a line with one of the shorter second groove segments of one of the shoulder circumferential grooves.

* * * * *